United States Patent
Helmick et al.

(10) Patent No.: US 12,182,436 B2
(45) Date of Patent: Dec. 31, 2024

(54) COMMUNICATING INFORMATION FOR PERFORMING A LIVE MIGRATION USING RECURSIVE LARGE-TO-SMALL-GRANULARITY QUERYING

(71) Applicant: Samsung Electronics Co., Ltd., Suwon-si (KR)

(72) Inventors: Daniel Lee Helmick, Broomfield, CO (US); Vipin Kumar Agrawal, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 147 days.

(21) Appl. No.: 18/160,414

(22) Filed: Jan. 27, 2023

(65) Prior Publication Data
US 2024/0126468 A1 Apr. 18, 2024

Related U.S. Application Data

(60) Provisional application No. 63/415,558, filed on Oct. 12, 2022.

(51) Int. Cl.
G06F 3/06 (2006.01)

(52) U.S. Cl.
CPC .......... G06F 3/0647 (2013.01); G06F 3/0604 (2013.01); G06F 3/067 (2013.01)

(58) Field of Classification Search
CPC ...... G06F 3/0647; G06F 3/0604; G06F 3/067; G06F 3/064; G06F 3/065; G06F 3/0619
See application file for complete search history.

(56) References Cited

U.S. PATENT DOCUMENTS

| | | |
|---|---|---|
| 6,856,993 B1 | 2/2005 | Verma et al. |
| 7,562,110 B2 | 7/2009 | Miloushev et al. |
| 7,779,426 B2 | 8/2010 | Rogers et al. |

(Continued)

FOREIGN PATENT DOCUMENTS

| | | |
|---|---|---|
| CN | 105938457 B | 10/2018 |
| CN | 109558333 A | 4/2019 |
| WO | 2022047619 A1 | 3/2022 |

OTHER PUBLICATIONS

EPO Extended European Search Report dated Feb. 26, 2024, issued in corresponding European Patent Application No. 23199661.2 (10 pages).

*Primary Examiner* — Tracy C Chan
(74) *Attorney, Agent, or Firm* — Lewis Roca Rothgerber Christie LLP

(57) ABSTRACT

Provided is a method for communicating information, the method including determining, by a storage device, that a first region of a source storage includes a storage location including data to be copied from the source storage to a target storage, the first region having a size that is equal to a first granularity size, determining, by the storage device, that a second region within the first region includes the storage location, the second region having a size that is equal to a second granularity size that is less than the first granularity size, determining that the second region is associated with a threshold value, exiting a query pattern that includes the first granularity size and the second granularity size, and sending a results data structure indicating that the second region comprises the storage location.

20 Claims, 5 Drawing Sheets

(56) References Cited

U.S. PATENT DOCUMENTS

| | | | |
|---|---|---|---|
| 7,886,041 B2 | 2/2011 | Outhred et al. | |
| 8,396,895 B2 | 3/2013 | Miloushev et al. | |
| 9,946,485 B1 * | 4/2018 | Don | G06F 11/2048 |
| 10,248,322 B2 | 4/2019 | Kanno | |
| 10,289,545 B2 | 5/2019 | Talagala et al. | |
| 10,387,045 B2 | 8/2019 | Chung et al. | |
| 11,169,920 B2 | 11/2021 | Stonelake et al. | |
| 2011/0066597 A1 * | 3/2011 | Mashtizadeh | G06F 9/45558 |
| | | | 707/E17.001 |
| 2017/0206019 A1 * | 7/2017 | Zhang | G06F 3/065 |
| 2020/0319815 A1 | 10/2020 | Dutta et al. | |
| 2021/0263762 A1 | 8/2021 | Kachare et al. | |
| 2022/0405253 A1 | 12/2022 | Agrawal et al. | |

\* cited by examiner

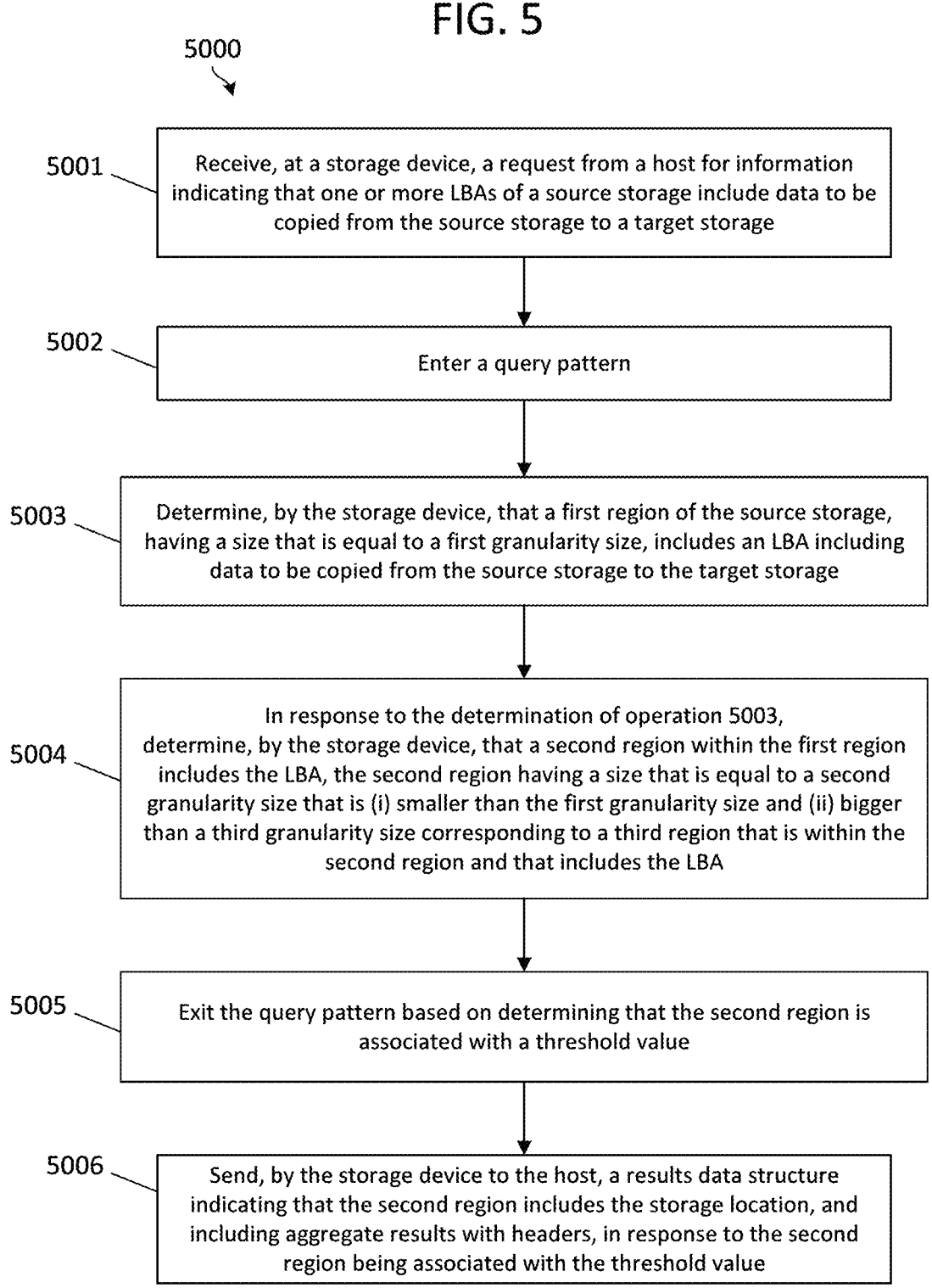

COMMUNICATING INFORMATION FOR PERFORMING A LIVE MIGRATION USING RECURSIVE LARGE-TO-SMALL-GRANULARITY QUERYING

CROSS-REFERENCE TO RELATED APPLICATION(S)

The present application claims priority to, and the benefit of, U.S. Provisional Application Ser. No. 63/415,558, filed Oct. 12, 2022, entitled "EFFICIENT COMMUNICATION OF MAPPED AND DIRTY BITMAP TRACKING OVER A NAMESPACE," the entire content of which is incorporated herein by reference.

FIELD

One or more aspects of one or more embodiments according to the present disclosure relate to systems and methods for data storage.

BACKGROUND

The present background section is intended to provide context only, and the disclosure of any embodiment or concept in this section does not constitute an admission that said embodiment or concept is prior art.

In the field of data storage, a live migration (or "LM") operation (or live migration process) may refer to an operation or process of copying data from a source storage to a target storage (e.g., a migration process) at a time when the source storage may potentially receive user data reads or user data writes (e.g., the source storage is live) from a server (e.g., a source server or host). As used herein, a "live migration" component (e.g., "live migration server" or "live migration storage device," etc.) refers to a component that may be involved with the transfer of data from a source storage to a target storage, and that may have higher/additional privileges (e.g., higher/additional privileges to access data within the system) than other components of the system. Some processes for live migration may create metadata to track locations of data within the source storage to be copied to the target storage.

Accordingly, there may be methods, devices, and systems that are suitable for improving the communication of metadata for performing live migration.

SUMMARY

Aspects of embodiments of the present disclosure relate to computer storage systems, and provide improvements to the communication of metadata (e.g., bitmaps and/or LBA lists) for identifying locations in a source storage having data to be copied to a target storage.

According to one or more embodiments of the present disclosure, there is provided a method for communicating information, the method including determining, by a storage device, that a first region of a source storage includes a storage location including data to be copied from the source storage to a target storage, the first region having a size that is equal to a first granularity size, determining, by the storage device, that a second region within the first region includes the storage location, the second region having a size that is equal to a second granularity size that is less than the first granularity size, determining that the second region is associated with a threshold value, exiting a query pattern that includes the first granularity size and the second granularity size, and sending a results data structure indicating that the second region includes the storage location.

The method may further include receiving, at the storage device, a request for information indicating that one or more storage locations include data to be copied from the source storage to the target storage, the request being associated with the first granularity size, wherein the results data structure includes a bitmap indicating that the first region or the second region includes one or more storage locations including data to be copied from the source storage to the target storage, or a listing of one or more logical block addresses (LBAs) including the data to be copied.

The method may further include determining that a number of storage locations that are within the first region or the second region and that include data to be copied from the source storage to the target storage is equal to or less than a threshold number of storage locations as the threshold value, wherein the results data structure includes the listing of the one or more LBAs.

The method may further including determining that a number of storage locations that correspond to a second bitmap and that include data to be copied from the source storage to the target storage is equal to or less than a threshold number of storage locations per bitmap as the threshold value, wherein the first region is associated with a first bitmap, wherein the second region is associated with the second bitmap, wherein the second bitmap indicates that one or more storage locations within the second region include data to be copied from the source storage to the target storage, and wherein the results data structure includes the listing of the one or more LBAs.

The method may further include determining that the second granularity size is equal to or less than a threshold granularity size as the threshold value, wherein the results data structure includes the listing of the one or more LBAs.

The method may further include copying data corresponding to all storage locations within the second region, wherein the threshold value may include a threshold granularity size or a number of remaining contiguous LBAs.

The method may further include determining the first granularity size or the second granularity size based on information that is stored on the storage device, wherein the request for information is directed to a namespace including the one or more storage locations, and wherein the first region and the second region correspond to the namespace.

The query pattern may include a recursive query pattern, the second granularity size may be greater than a third granularity size corresponding to a third region that is within the second region, and that includes the storage location, the first region may be associated with a first data structure indicating that one or more storage locations within the first region include data to be copied from the source storage to the target storage, the second region may be associated with a second data structure indicating that one or more storage locations within the second region include data to be copied from the source storage to the target storage, and the results data structure may include a self-describing return data structure including the first data structure, the second data structure, a global header, and a bitmap header or an LBA list header.

According to one or more other embodiments of the present disclosure, there is provided a storage device for communicating information, the storage device being configured to determine that a first region of a source storage includes a storage location including data to be copied from the source storage to a target storage, the first region having a size that is equal to a first granularity size, determine that a second region within the first region includes the storage location, the second region having a size that is equal to a second granularity size that is less than the first granularity size, determine that the second region is associated with a threshold value, exit a query pattern that includes the first granularity size and the second granularity size, and send a results data structure indicating that the second region includes the storage location.

The storage device may be configured to receive a request for information indicating that one or more storage locations include data to be copied from the source storage to the target storage, the request being associated with the first granularity size, wherein the results data structure includes a bitmap indicating that the first region or the second region includes one or more storage locations including data to be copied from the source storage to the target storage, or a listing of one or more logical block addresses (LBAs) including the data to be copied.

The storage device may be configured to determine that a number of storage locations that are within the first region or the second region and that include data to be copied from the source storage to the target storage is equal to or less than a threshold number of storage locations as the threshold value, wherein the results data structure includes the listing of the one or more LBAs.

The storage device may be configured to determine that a number of storage locations that correspond to a second bitmap and that include data to be copied from the source storage to the target storage is equal to or less than a threshold number of storage locations per bitmap as the threshold value, wherein the first region is associated with a first bitmap, wherein the second region is associated with the second bitmap, wherein the second bitmap indicates that one or more storage locations within the second region include data to be copied from the source storage to the target storage, and wherein the results data structure includes the listing of the one or more LBAs.

The storage device may be configured to determine that the second granularity size is equal to or less than a threshold granularity size as the threshold value, wherein the results data structure includes the listing of the one or more LBAs.

The method may further include copying data corresponding to all storage locations within the second region, wherein the threshold value may be a threshold granularity size or a number of remaining contiguous LBAs.

The storage device may be configured to determine the first granularity size or the second granularity size based on information that is stored on the storage device, wherein the request for information is directed to a namespace including the one or more storage locations, and wherein the first region and the second region correspond to the namespace.

The query pattern may include a recursive query pattern, the second granularity size may be greater than a third granularity size corresponding to a third region that is within the second region, and that includes the storage location, the first region may be associated with a first data structure indicating that one or more storage locations within the first region include data to be copied from the source storage to the target storage, the second region may be associated with a second data structure indicating that one or more storage locations within the second region include data to be copied from the source storage to the target storage, and the results data structure may include a self-describing return data structure including the first data structure, the second data structure, a global header, and a bitmap header or an LBA list header.

According to one or more other embodiments of the present disclosure, there is provided a method for communicating information, the method including receiving, at a storage device, an initial request for information indicating that one or more storage locations include data to be copied from a source storage to a target storage, the initial request being associated with a first granularity size, determining, by the storage device, that a first region of the source storage includes a storage location including data to be copied from the source storage to the target storage, the first region having a size that is equal to the first granularity size, and determining automatically, based on the initial request, that a second region within the first region includes the storage location, the second region having a size that is equal to a second granularity size that is less than the first granularity size.

The method may further include determining that the second region is associated with a threshold value, and sending, by the storage device, a results data structure.

The method may further include determining that the second region is associated with the threshold value, and exiting a recursive query pattern that includes the first granularity size and the second granularity size.

The first region may be associated with a first data structure indicating that one or more storage locations within the first region include data to be copied from the source storage to the target storage, the second region is associated with a second data structure indicating that one or more storage locations within the second region include data to be copied from the source storage to the target storage, and the results data structure includes a self-describing return data structure including the first data structure, the second data structure, a global header, and a bitmap header or an LBA list header.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 5 is a flowchart depicting example operations of methods for the communicating information for performing a live migration, according to some embodiments of the present disclosure.

Figure 1:
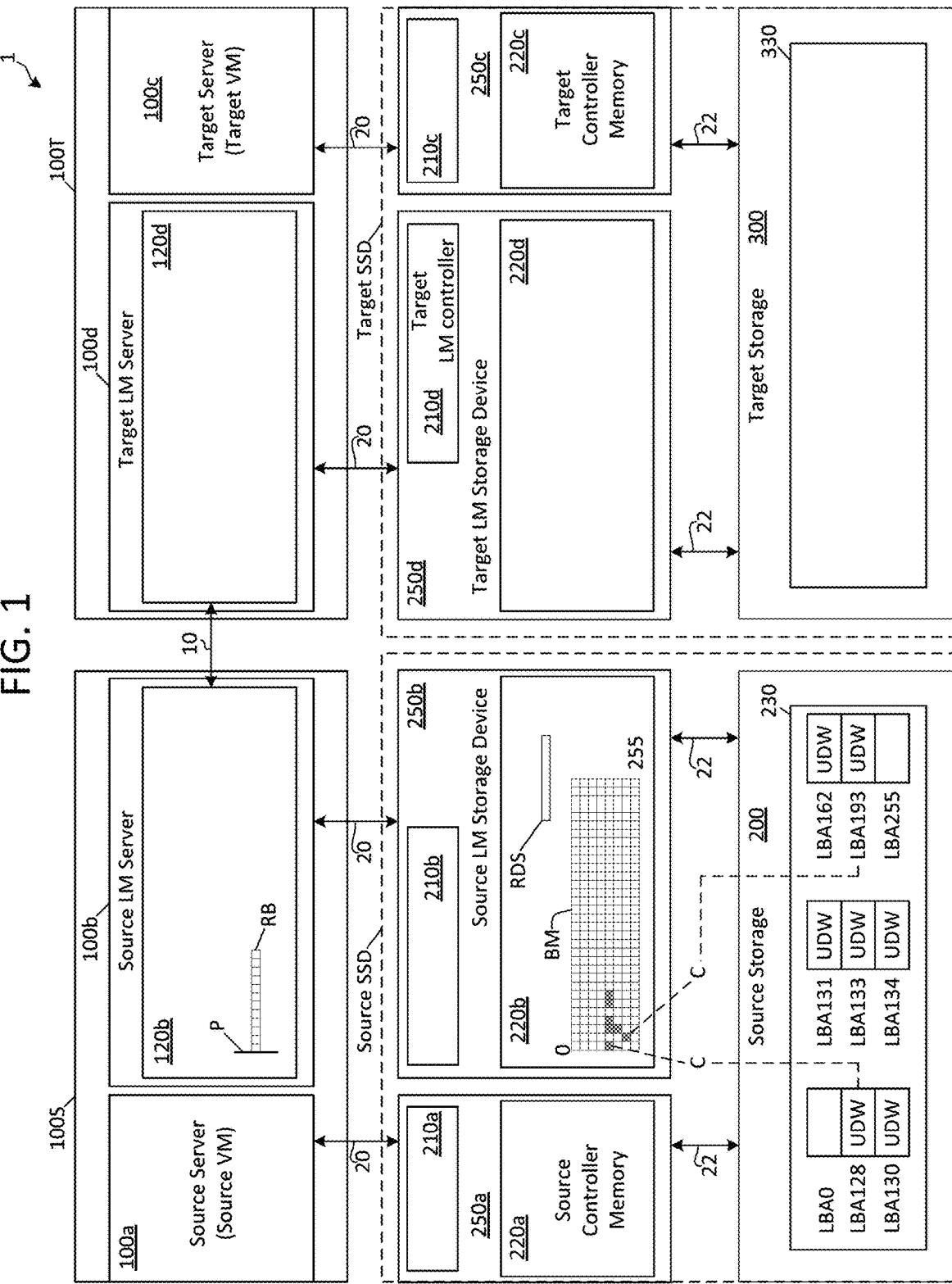
FIG. 1 is a system diagram depicting a system for communicating information for performing a live migration, according to one or more embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements and regions in the figures may be exaggerated relative to other elements and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, and/or sections, these elements, components, regions, and/or sections should not be limited by these terms. These terms are used to distinguish one element, component, region, or section from another element, component, region, or section. Thus, a first element, component, region, or section described below could be termed a second element, component, region, or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented using any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of data storage, a live migration operation (or live migration process) may refer to a process or operation of copying data from a source storage to a target storage at a time when the source storage may potentially receive a user data read or write from a source host (e.g., a host that may be assigned lower supervising privileges than a hypervisor (or live migration server)). For example, a data center owner, operator, and/or a software platform operator selling compute resources may implement a live migration strategy, wherein data corresponding to a source storage may be moved from the source storage to a new (or target) storage while the data at the source storage may be changing (e.g., the data may be updated based on the reception of user data writes). A live migration strategy may involve moving a namespace (e.g., a grouping of objects in a storage) from a source controller (or source storage) to a target controller (or target storage).

As will be discussed in further detail below with reference to the figures, a source live migration controller may assist a source live migration server in managing a live migration operation by creating tracking metadata (e.g., metadata for tracking valid or dirty pages). For example, generating the tracking metadata may include the creation of a bitmap of "mapped" pages (a "BMP") (e.g., pages corresponding to valid data to be copied from a source storage to a target storage) at the beginning of the live migration process, and one or more subsequent bitmaps of "dirty" pages (a "BDP") (e.g., pages corresponding to mapped pages that receive user data writes during the copying of the valid data from the source storage to the target storage) during the live migration process. For example, the source live migration controller may build the BMP on demand and use the BMP for a first iteration of data copying for the live migration process. The source live migration controller may then track subsequent user data writes in a BDP during a second or later iteration of data migration, following a prior BMP or a prior BDP query from the source live migration server.

As used herein, a valid page refers to a page (or LBA) that corresponds to a particular namespace, and that has data (e.g., valid data) present to be copied from a source storage to a target storage. Valid data may be present at source storage locations that received a write or a copy of user data (e.g., from a source virtual machine (VM)). Valid data may not be present at source storage locations that have not received a write since a last format operation or a last erase operation. Valid data may not be present at source locations that have not received a write since a last write was deallocated. A deallocated write refers to a write that was unmapped (or "trimmed"). In some embodiments, data may be written and then deallocated but not regrouped as not valid. In such embodiments, valid data may include data at a storage location corresponding to a deallocated write. In some embodiments, a Write Zero and/or a Write Uncorrectable may be considered valid data depending on a preferred use-case definition.

As used herein, a Write Zero (or Write Zeros) refers to a write command that does not require the transfer of data. The command may cause a storage device to write data values of zero (e.g., all data values of zero) to LBA ranges provided in the command. The storage device may program these zeros to the storage media for later robust reads of the data, and the storage device may also mark a sentinel value in the Logical to Physical (L2P) look-up table. For example, the sentinel value might be 0xFFFFFFFF. When the live migration server later reads an LBA corresponding to the sentinel value, the storage device may look into the L2P look-up table to discover the sentinel value. For example, the sentinel value may be out of the range of possible physical locations, which allows the storage device to determine that the sentinel value is a sentinel value. Looking up the meaning of the sentinel value may cause the storage device to return zeros (e.g., all zeros) for the LBA's data. If the Write Zeros command corresponds to a range of LBAs, the sentinel value may be put in the L2P table for each of the LBAs in the range.

As used herein, a Write Uncorrectable refers to a write command that is similar to a Write Zero command; however, instead of programming zeros to the storage media, the storage device may program data and Error Correction Code (ECC) metadata that may fail to be decoded correctly by the ECC decode engine when read in the future. In some embodiments, a different sentinel value than the sentinel value used for a Write Zeros command may be put in the L2P look-up table (e.g., 0xFFFFFFFE). When the live migration server reads an LBA that was previously written with an uncorrectable value, the read may fail to be decoded. The storage device may return the appropriate error or completion status to this read.

In some embodiments, a Write Zero and/or a Write Uncorrectable may not be considered valid data depending on a preferred use-case definition. In some embodiments, valid data may be considered to be mapped data because a storage device continues to point to a location at the source storage where the data can be found, even if the data was written to be zeros (or something similar).

As used herein, a dirty page refers to a page (or LBA) having changed data (e.g., dirty data) on a source storage that may be copied to a target storage because the data at the LBA in the source storage does not match the data at the LBA in the target storage. Dirty data may be present at source storage locations that received a write or a copy of user data (e.g., from a source VM). In some embodiments, a page that has received a write or a copy and has, thus, been marked as a dirty page may be deallocated (or "unmarked"). In some embodiments, the deallocated page may be considered as including dirty data depending on a preferred use-case definition. In some embodiments, the deallocated page may be considered as not including dirty data, depending on a preferred use-case definition. In some embodiments, a Write Zero and/or a Write Uncorrectable may be considered dirty data depending on a preferred use-case definition. In some embodiments, a Write Zero and/or a Write Uncorrectable may not be considered dirty data depending on a preferred use-case definition.

To provide an overview of live migration, one or more of the following operations may be part of a live migration process. A host (e.g., a source live migration server) may use a BMP at the beginning of the live migration process so that the host may selectively copy (e.g., only copy) mapped data from a source storage to a target storage. Using the BMP may accelerate the migration process by reducing the amount of data moved through both drives (e.g., a source live migration storage device and a target live migration storage device) and across a network in a data center (e.g., across a live-migration-server-to-target link 10 (see FIGS. 1 and 2 below)).

The host may query to receive a BDP after the initial BMP and any subsequent BDP. Using the BDP allows the host to selectively copy (e.g., only copy) data that is changed since the last query. An amount of data queried may be expected to "trend toward epsilon" as the process of copying may be performed more quickly (e.g., less data may be copied in each subsequent iteration of copying for the live migration process). Eventually, the copied data may be determined to be at an acceptably small size, and the host may pause operations of both a source VM (e.g., a source server) and the storage (e.g., the source storage and the target storage) once all of the final migration states and final data as described by the last remaining BDP are moved from the source storage and the source VM to the target storage and a target VM (e.g., a target server). A target LM server may restart the target storage and the target VM as a final operation of the live migration process.

The tracking metadata may assist in providing information to the source live migration server. The tracking metadata may indicate where data at the source storage has been updated or changed subsequent to the source live migration server copying the data from the source storage to the target storage.

The performance of a live migration system may be burdened during a live migration due to a relatively heavy drain on computing resources (e.g., resources corresponding to memory usage and bandwidth). For example, in the case of creating an initial BMP, the source live migration storage controller may create or maintain a BMP having a size corresponding to an entire namespace. The size of the subsequent BDPs may also be significant. Thus, creating and transferring the initial BMP information and the subsequent BDP information may consume significant computing resources at a source live migration storage device. Additionally, transferring the BMP and each subsequent BDP from the source live migration storage device to the source live migration server, and parsing the BMP and subsequent BDPs by the source live migration server, may consume significant bandwidth and may cause significant latencies.

For example, in one or more embodiments, the live migration system may use a query pattern (e.g., a recursive large-to-small-granularity query pattern) to avoid sending large sections of a BMP lacking any valid pages and/or to avoid sending relatively large sections of a BDP not having dirty pages. In one or more embodiments, a recursive large-to-small-granularity query pattern may include one or more of the following operations described below. Although the present disclosure discusses a recursive query pattern in detail, it should be understood that the present disclosure is not limited thereto. For example, in some embodiments, the live migration system may use an iterative query pattern.

The source live migration server may send a first request (e.g., a first query or a first administrative command) for information from the source live migration storage device, the information indicating whether ranges of LBAs having a large granularity size include valid or dirty pages. For example, the information may indicate locations of data to be copied from the source storage to the target storage. The source live migration storage device may divide the name space into multiple large regions having the large granularity size. The source live migration storage device may determine which of the large regions include LBAs with valid or dirty pages. The source live migration storage device may send a first response to the source live migration server's first request, the first response having a first data structure (e.g., a first bitmap) that indicates which of the large sections include valid or dirty pages.

The source live migration server may send, to the source live migration storage device, a second request (e.g., a second query or a second administrative command) for information indicating whether valid or dirty pages are included within ranges of LBAs that have a smaller granularity size than the granularity size of the previous request, and that are within the ranges of LBAs from the previous request. The source live migration storage device may determine which of the smaller regions include LBAs with valid or dirty pages. The source live migration storage device may send a second response to the source live migration server's second request with a second data structure (e.g., a second bitmap) indicating which of the large sections include valid or dirty pages.

In one or more embodiments, this recursive large-to-small-granularity query pattern may repeat until the granularity size associated with the request is equal to the size of one LBA. In one or more embodiments, the recursive large-to-small-granularity query pattern may repeat until the granularity size associated with the request is sufficiently small (e.g., eight LBAs), such that excessive or redundant copying of LBAs not including valid data or dirty data is considered acceptable.

To improve bandwidth and latency, it may be desirable to reduce a number of administrative commands from the source live migration server to the source live migration storage device before the source live migration storage device sends a response indicating the precise LBAs that include valid or dirty pages. To improve bandwidth and latency, it may also be desirable to reduce a number of administrative commands from the source live migration server to the source live migration storage device before the source live migration server decides that a given granularity size is sufficiently small, such that every LBA within a region corresponding to the given granularity size may be copied by the source live migration server, even though some of the LBAs within the region may not include valid or dirty pages. For example, some excessive or redundant copying may be performed due to some LBAs within the region not including either valid or dirty pages. However, at a sufficiently small granularity size, any such excessive or redundant copying may be acceptable as long as all the changes to the data are captured.

A system configured to communicate information for performing a live migration using recursive large-to-small-granularity querying may have improved bandwidth and latency characteristics by, for example, (i) reducing a number of administrative commands based on an exit threshold, (ii) reducing a number of administrative commands based on automation of a recursive query-and-response pattern, and/or (iii) using a self-describing return structure including accumulated-results data structures (e.g., sending aggregate results with headers).

For example, a source live migration server may send a first request (e.g., a first query or a first administrative command) for information from the source live migration storage device indicating whether ranges of LBAs having a large granularity size include valid or dirty pages. In some embodiments, the source live migration storage device may enter a recursive large-to-small-granularity query pattern. In one or more embodiments, before sending a response to the source live migration server including a bitmap, which indicates the relevant regions that include valid or dirty pages, the source live migration controller may determine whether a threshold value has been met (e.g., whether a threshold associated with a number of LBAs having valid or dirty pages within one or more relevant regions has been crossed). The threshold value (e.g., an exit threshold or early-exit threshold) may correspond to the relevant regions and whether a number of LBAs having valid or dirty pages within the relevant regions is equal to or less than the threshold value. For example, the relevant region may be LBAs 128 to 135, and the threshold value may be less than two LBAs within the relevant region having valid or dirty data. In response to determining that the threshold value has been met (e.g., only one of LBAs 128 to 135 has valid or dirty data), the source live migration controller may exit the query pattern early (e.g., before a smallest granularity size of the source storage has been queried), and may send a results data structure including a bitmap or an LBA list to the source live migration server to indicate the precise storage locations that include valid or dirty pages.

In one or more embodiments, the granularity sizes of the recursive large-to-small-granularity query pattern and/or the exit threshold may be stored on the source live migration storage device, such that the recursive large-to-small-granularity querying pattern may be automated within the source live migration storage device based on a single command from the source live migration server. For example, one command may be sent to the source live migration storage device to trigger a recursive query-and-response pattern associated with one or more large-to-small-granularity query loops (e.g., one or more iterations).

In one or more embodiments, the source live migration storage device may accumulate bitmaps corresponding to each iteration of the recursive query pattern. These bitmaps might otherwise have been sent back by the source live migration storage device to the source live migration server after each iteration. In some embodiments, upon reaching the exit threshold, the source live migration storage device may exit the recursive pattern, and may send a results data structure that includes accumulated bitmaps and/or an LBA list to the source live migration server using a self-describing return structure.

FIG. 1 is a system diagram depicting a system for communicating information for performing a live migration, according to one or more embodiments of the present disclosure.

Referring to FIG. 1, the system 1 may include a source host system 100S and a target host system 100T. The source host system 100S may be connected to a source storage 200. The target host system 100T may be connected to a target storage 300. The source host system 100S and the target host system 100T may be associated with, or may include, central processing units (CPUs). The source storage 200 and the target storage 300 may include logical block addresses (LBAs) (e.g., LBA0 to LBA255, some of which are depicted within the source storage 200 in FIG. 1 for a simplified example). The LBAs may be associated with physical locations in the source storage 200 and in the target storage 300 for storing data (e.g., user data).

The target host system 100T may include a target server 100c. The target server 100c may be a host or may be a target VM. The target server 100c may be connected to a target storage device 250c via a communications link 20. The communications link 20 may include, or may be implemented by way of, a variety of technologies (e.g., peripheral component interconnect express (PCIe), nonvolatile memory express (NVMe) over PCIe, NVMe over Fabrics (NVMe-oF), etc.).

The target storage device 250c may include a target storage controller 210c and a target controller memory 220c. The target controller memory 220c may include, or may be, RAM (e.g., static random-access memory (SRAM) or dynamic random-access memory (DRAM)). The target storage controller 210c may include, or may be implemented by way of, embedded logic. The embedded logic may be embedded within the target storage device 250c. The embedded logic may enable the target storage controller 210c to handle requests from a server (e.g., the target server 100c) to copy/write data to the target storage 300.

The target storage device 250c may include the target storage 300 (or a portion of the target storage 300). For example, the target storage 300 may include a target memory 330. The target memory 330 may include, or may be, a long-term memory. For example, the target memory 330 may include a nonvolatile memory and/or a memory tier (including volatile and nonvolatile memory), and may correspond to long-term memory devices of one or more target storage devices 250c. For example, the target storage 300 may refer to a long-term memory made up of one or more target storage devices 250c of a distributed storage system (e.g., a virtualized distributed storage system). The target storage device 250c may be a solid-state drive (SSD) including one or more underlying target storage devices 250c, which may be virtual or physical. The target storage device 250c may be connected to the target storage 300 via a storage interface 22. The storage interface 22 may include, or may be, a flash interface (e.g., a NAND flash interface, Toggle Mode, or Open NAND Flash Interface (ONFI)) or a remote interface (e.g., an interface that is implemented by way of Ethernet).

In one or more embodiments, the communications links 20 and the storage interfaces 22 may be shared connections. For example, the source storage 200 may be all the same NAND, and the source storage controller 210a and the source live migration controller 210b may be the same controller (e.g., the same ASIC controller). In such embodiments, the storage interfaces 22 may be the same NAND channel going between the two entities (e.g., the source storage device 250a and the source live migration storage device 250b). Similarly, the communications links 20 may connect both the source storage controller 210a and the source live migration controller 210b respectively to the source server 100a and the source live migration server 100b on the same link (e.g., the same PCIe link).

The source host system 100S may include a source server 100a. The source server 100a may be a host or may be a source VM. The source server 100a may serve read and write requests from a user application. For example, a user may use an application (e.g., a word-processing application)

to send a user data write UDW (e.g., a user application data write request) or a user data read UDR (e.g., a user application data read request) to the source storage 200. The read/write requests may be sent to the source storage 200 via the source storage device 250a.

The source server 100a may be connected to a source storage device 250a via a communications link 20. The communications link 20 may include, or may be implemented by way of, a variety of technologies (e.g., PCIe, NVMe over PCIe, NVMe-oF, etc.).

The source storage device 250a may include a source storage controller 210a and a source controller memory 220a. The source controller memory 220a may include, or may be, RAM (e.g., SRAM or DRAM). The source storage controller 210a may include, or may be implemented by way of, embedded logic (e.g., software or firmware embedded within the source storage device 250a) for handling requests from a server (e.g., the source server 100a) to copy/write data to the source storage 200. The source storage device 250a may include the source storage 200 or a portion thereof.

For example, the source storage 200 may include a source memory 230. The source memory 230 may include, or may be, a long-term memory. For example, the source memory 230 may include a nonvolatile memory and/or a memory tier (including volatile and nonvolatile memory). The source memory 230 may correspond to long-term memory devices of one or more source storage devices 250a. For example, the source storage 200 may refer to a long-term memory made up of one or more source storage devices 250a of a distributed storage system, such as a virtualized distributed storage system. The source storage device 250a may be a solid-state drive (SSD) including one or more underlying source storage devices 250a. The underlying source storage devices may be virtual or physical. The source storage device 250a may be connected to the source storage 200 via a storage interface 22. The storage interface 22 may include, or may be, a flash interface (e.g., a NAND flash interface, Toggle Mode, or ONFI) or a remote interface, which may be implemented by way of Ethernet.

The source host system 100S may include a source live migration server 100b. The source live migration server 100b may be a server that is assigned higher/additional privileges in comparison to the source server 100a or the target server 100c. The privileges may correspond to data access within the system 1. The source live migration server 100b may be assigned to manage a live migration operation (e.g., a live migration process) for copying data from the source storage 200 to the target storage 300. The source live migration server 100b may include a source live migration server memory 120b.

The source live migration server memory 120b may include, or may be, RAM (e.g., SRAM or DRAM). The source live migration server memory 120b may be used to store metadata for managing (e.g., monitoring and/or directing) the live migration operation. The source live migration server 100b may be connected to a source live migration storage device 250b via a communications link 20. The communications link 20 may include, or may be implemented by way of, a variety of technologies (e.g., PCIe, NVMe over PCIe, NVMe-oF, etc.).

The source live migration storage device 250b may be a storage device that is assigned higher/additional privileges in comparison to the source storage device 250a or the target storage device 250c. The assigned privileges may correspond to the access of data within the system 1. The source live migration storage device 250b may be assigned to assist in the live migration operation by reading data from the source storage 200.

The source live migration storage device 250b may include a source live migration controller memory 220b and a source live migration controller 210b.

The source live migration controller memory 220b may include, or may be, RAM (e.g., SRAM or DRAM). The source live migration controller memory 220b may be used to store metadata for managing (e.g., monitoring and/or directing) the live migration operation.

The source live migration controller 210b may include, or may be implemented by way of, embedded logic, which may be part of the source live migration storage device 250b, for assisting the source live migration server 100b in copying data from the source storage 200 to the target storage 300.

The source live migration storage device 250b may be connected to the source storage 200 via a storage interface 22. The storage interface 22 may include, or may be, a flash interface (e.g., a NAND flash interface) or a remote interface (e.g., implemented by way of Ethernet).

The source live migration server 100b may be connected or linked to the target host system 100T via a live-migration-server-to-target link 10. The live-migration-server-to-target link 10 may be implemented by a variety of technologies depending on whether the system 1 is implemented via hardware (HW), software (SW), or a combination of HW and SW.

In addition to the target server 100c discussed above, the target host system 100T may include a target live migration server 100d. The target live migration server 100d may be a server that is assigned higher/additional privileges in comparison to the source server 100a or the target server 100c. The privileges may correspond to data access within the system 1. The target live migration server 100d may be assigned to assist the source live migration server 100b in managing the live migration operation. The target live migration server 100d may include a target live migration server memory 120d.

The target live migration server memory 120d may include, or may be, RAM (e.g., SRAM or DRAM). The target live migration server memory 120d may be used to store metadata for managing (e.g., monitoring and/or directing) the live migration operation. The target live migration server 100d may be connected to a target live migration storage device 250d via a communications link 20. The communications link 20 may include, or may be implemented by way of, a variety of technologies (e.g., PCIe, NVMe over PCIe, NVMe-oF, etc.).

The target live migration storage device 250d may be a storage device that is assigned higher/additional privileges in comparison to the source storage device 250a or the target storage device 250c. The assigned privileges may correspond to the access of data within the system 1. The target live migration storage device 250d may be assigned to assist in the live migration operation by writing data to the target storage 300 (e.g., data originating from the source storage 200).

The target live migration storage device 250d may include a target live migration controller memory 220d. The target live migration controller memory 220d may include, or may be, RAM (e.g., SRAM or DRAM). The target live migration controller memory 220d may be used to store metadata for managing (e.g., monitoring and/or directing) the live migration operation.

The target live migration storage device 250d may also include a target live migration controller 210d. The target live migration controller 210*d* may include, or may be implemented by way of, embedded logic, which may be part of the target live migration storage device 250*d*, for assisting the target live migration server 100*d* in writing data to the target storage 300. The target live migration storage device 250*d* may be connected to the target storage 300 via a storage interface 22. The storage interface 22 may include, or may be, a flash interface (e.g., a NAND flash interface) or a remote interface (e.g., implemented by way of Ethernet).

The servers and storage devices of the system 1 may be implemented via HW, SW, or a combination of HW and SW. For example, in some embodiments, the live-migration-server-to-target link 10 may be a physical network connection (e.g., Transmission Control Protocol/Internet Protocol (TCP-IP), Ethernet, remote direct memory access (RDMA), Infiniband, Fibrechannel, etc.). In some embodiments, one or more of the servers (e.g., the source server 100*a*, the source live migration server 100*b*, the target live migration server 100*d*, or the target server 100*c*) may be software entities. For example, one or more of the servers may be VMs managed by a hypervisor associated with one or more CPUs.

Likewise, one or more of the storage devices 250*a*, 250*b*, 250*c* and/or the source storage 200 and/or the target storage 300 may be virtualized and implemented by way of HW and/or SW techniques. For example, one or more of the storage devices 250*a*, 250*b*, 250*c* and/or the source storage 200 and/or the target storage 300 may be provided by any combination of physical storage devices. In one or more embodiments, and as indicated by the dashed lines in FIG. 1, the source storage device 250*a*, the source live migration storage device 250*b*, and the source storage 200 may be components of a source SSD. Similarly, the target storage device 250*c*, the target live migration storage device 250*d*, and the target storage 300 may be components of a target SSD. In one or more other embodiments, a migration may be from a first virtual machine to a second virtual machine, noting that both virtual machines may be supported by one physical storage device. It should be understood that a variety of other combinations between, for example, physical and virtual devices may be implemented, and do not depart from the spirit and scope of the present disclosure. For example, in one or more embodiments, the migration may be a local migration involving one server system and there may be no live-migration-server-to-target link 10 between two live migration servers. In one or more embodiments, the migration may involve one live migration storage device. For example, one or more live migration storage controllers within a same SSD may manage a migration of data from a source storage 200 to a target storage 300 on the same SSD with potentially new namespace and LBA changes. Alternatively, one or more live migration storage controllers within a same SSD may manage the migration through namespace sharing and NVMe access changes.

In some embodiments, the source live migration server 100*b* may be linked (e.g., connected) to the target storage device 250*c* via a communications link 20. In some embodiments, the source server 100*a* may be linked to the source live migration server 100*b* via a live-migration-server-to-source link. For example, the live-migration-server-to-source link may be implemented by a variety of technologies, which may be implemented depending on whether the system 1 is implemented via HW, SW, or a combination of HW and SW.

The source live migration server 100*b* and the source live migration controller 210*b* may coordinate a management of a live migration process by communicating metadata that is indicative of a status of data corresponding to the LBAs in the source storage 200. For example, the source live migration server 100*b* may send metadata associated with a namespace to the source live migration controller 210*b*. The source live migration controller 210*b* may work on mapping the namespace to the relevant data (e.g., valid data) that is within the source storage 200, and that is to be copied to the target storage 300. The source live migration controller 210*b* may create a bitmap BM of metadata as it maps the namespace to the source storage.

For example, at a mapping stage of the live migration process, the bitmap BM may be referred to as a bitmap of mapped pages (a "BMP"), each LBA being referred to as a "page" or "NAND page." At a data-copying stage of the live migration process, the bitmap BM may be referred to as a bitmap of dirty pages (a "BDP"). During the mapping stage, the source live migration server 100*b* refers to the BMP to determine which storage locations of the source storage 200 include data to be copied over to the target storage 300. While the source live migration server 100*b* copies the data from the source storage 200 to the target storage 300 in accordance with the BMP, the source live migration storage device 250*b* may track user data writes UDW that occur at the source storage 200 using the BDP. After the source live migration server 100*b* has completed the process of copying data based on the BMP, the source live migration controller 210*b* may send the source live migration server 100*b* information indicating the locations of dirty pages for copying data from the source storage 200 to the target storage 300, based on the BDP.

The BMP and the BDP may include bits representing whether a given LBA includes valid or dirty data to be copied to the target storage 300. Each LBA may include 4 kilobytes (KB) of data. Each LBA may be represented by one bit in the bitmap. For example, a "0" bit may indicate that a given LBA has no valid or dirty data to be copied (e.g., see reference character C in FIG. 1) to the target storage 300. Further, a "1" bit may indicate that a given LBA does have valid or dirty data to be copied C to the target storage 300. Thus, an entire drive having a large storage capacity, e.g., 8 terabytes (TB) of data in the source storage 200, may be represented by way of a bitmap having, e.g., 256 megabytes (MB) of metadata.

Referring still to FIG. 1, the bitmap BM corresponds to a BDP of a simple example. The bitmap BM in FIG. 1 is depicted as having tracked user data writes UDW to one drive having one namespace of 256 LBAs. The bitmap BM has tracked user data writes UDW to LBA 128, LBA 130, LBA 131, LBA 133, LBA 134, LBA 162, and LBA 193. Accordingly, the bitmap BM having LBAs ranging in number from 0 to 255 indicates, by way of shaded boxes in the bitmap BM indicating "1" bits, that LBA 128, LBA 130, LBA 131, LBA 133, LBA 134, LBA 162, and LBA 193 have data to be copied C from the source storage 200 to the target storage 300.

As discussed above, the source live migration storage device 250*b* may receive a request from the source live migration server 100*b* to send information to the source live migration server 100*b*. The information may indicate whether one or more storage locations (e.g., LBAs), within one or more large-granularity regions of the source storage 200 include data to be copied C from the source storage 200 to the target storage 300. The source live migration storage device 250*b* may enter a recursive large-to-small-granularity query pattern. The source live migration storage device 250*b* may generate a results data structure RDS based on one or more query-and-response iterations of the recursive large-to-small-granularity query pattern.

The request from the source live migration server 100*b* may include a pointer P notifying the source live migration storage device 250*b* of where to send the results data structure RDS within the source live migration server memory 120*b*. For example, the pointer P may correspond to a return buffer RB for storing the results data structure RDS.

In addition to improving bandwidth and latency, one or more aspects of one or more embodiments of the present disclosure may reduce an amount of memory consumed by storing the results data structure RDS. For example, all of the LBAs that include data to be copied from a hypothetical source storage 200 that has a 1-Petabyte (PB) drive capacity could be indicated within a return buffer RB having a size of only 16 kilobytes (KB).

Figure 2:
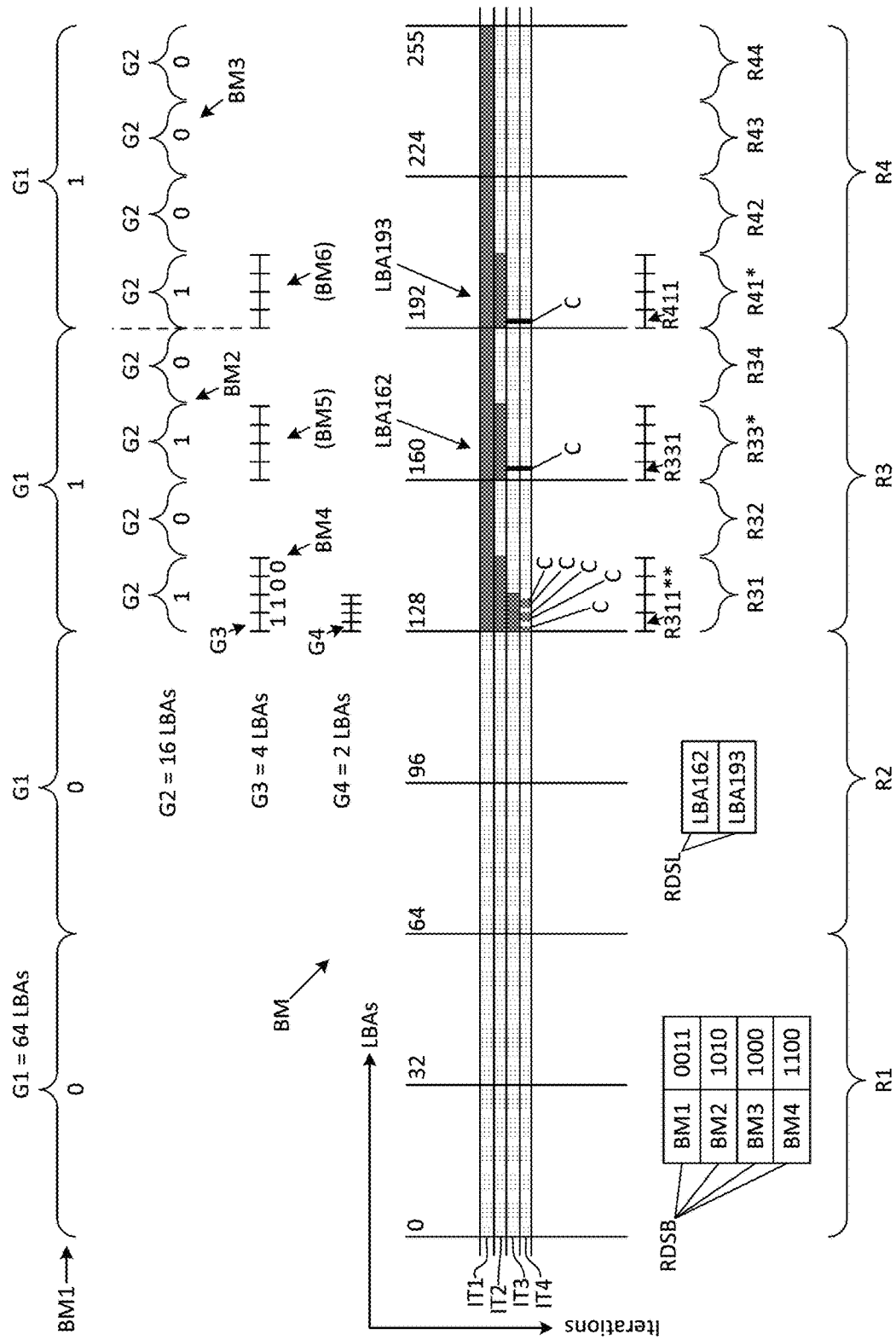
FIG. 2 is a conceptual diagram depicting methods for communicating information for performing a live migration with respect to a simple example, according to one or more embodiments of the present disclosure.

FIG. 2 is a conceptual diagram depicting methods for communicating information for performing a live migration with respect to a simple example, according to one or more embodiments of the present disclosure.

Referring to FIG. 2, the BDP of the simple example discussed above (with respect to FIG. 1) is provided to discuss further details. In this simple example, communication between the source live migration server 100*b* and the source live migration storage device 250*b* (see FIG. 1) may be limited to a bitmap size of 4 bits. Thus, the bitmap BM having 256 LBAs with data to be copied C from the source storage 200 to the target storage 300 at only LBA 128, LBA 130, LBA 131, LBA 133, LBA 134, LBA 162, and LBA 193 would waste significant time/resources/overhead if the bitmap BM were to query four bits at a time from LBA 0 to LBA 255. Thus, to provide a more efficient communication of mapped bitmap and dirty bitmap tracking over a namespace corresponding to the 256 LBAs, the source live migration storage device 250*b* may be configured to respond to a recursive large-to-small-granularity querying pattern.

The source live migration storage device 250*b* may receive a request for information indicating that one or more LBAs corresponding to the bitmap BM include data to be copied C from the source storage 200 to the target storage 300. The recursive large-to-small-granularity querying pattern may be associated with a number of assumptions. For example, as mentioned above, the bitmap size may be limited to 4 bits. Further, the granularity settings may include a first granularity size G1 of 64 LBAs, a second granularity size G2 of 16 LBAs, a third granularity size G3 of 4 LBAs, and fourth granularity size G4 of 2 LBAs. The recursive pattern may also be associated with a threshold value TV (e.g., an exit threshold). For example, as will be discussed in further detail below, the threshold value TV may be a threshold number of storage locations TN. The threshold value TV may be a threshold number of storage locations per bitmap TNB. The threshold value TV may be a threshold granularity TG, or may be a threshold of storage locations remaining in a given region and having a sufficiently small granularity.

According to the above-mentioned recursive large-to-small-granularity querying pattern assumptions, in one or more embodiments, after receiving the request from the source live migration server 100*b*, the source live migration storage device 250 may proceed as follows. The source live migration server 100*b* may query the drive at LBA 0 with the first granularity size G1 of 64 LBAs in a first iteration IT1. Accordingly, the source live migration storage device 250*b* may divide the bitmap BM into four regions R1, R2, R3, and R4. Each of the four regions may have a size of 64 LBAs. R1 may correspond to LBAs 0 to 63, R2 may correspond to LBAs 64 to 127, R3 may correspond to LBAs 128 to 191, and R4 may correspond to LBAs 192 to 255. Because regions R1 and R2 do not include any dirty pages, and because regions R3 and R4 do include dirty pages, the source live migration storage device 250 may generate a results data structure bitmap RDSB including bitmap BM1 including the four bits (0, 0, 1, 1), thereby indicating that there are dirty LBAs in the LBA ranges 128-191 and 192-255. In one or more embodiments, the source live migration storage device 250 may send the bitmap BM1 to the source live migration server 100*b*.

The source live migration server 100*b* may query the drive at LBA 128 with the second granularity size G2 of 16 LBAs in a second iteration IT2. Accordingly, the source live migration storage device 250*b* may divide the region R3 into four regions R31, R32, R33, and R34. Each of the four regions may have a size of 16 LBAs. R31 may correspond to LBAs 128 to 143, R32 may correspond to LBAs 144 to 159, R33 may correspond to LBAs 160 to 175, and R34 may correspond to LBAs 176 to 191. (The single asterisks (*) depicted next to R33, R41, and TV in FIG. 2 is intended to link R33 and R41 to an example case, discussed below, where R33 and R41 meet a threshold number of storage locations TN or a threshold number of storage locations per bitmap TNB.) Because regions R31 and R33 include dirty pages, and because regions R32 and R34 do not include any dirty pages, the source live migration storage device 250*b* may generate a results data structure bitmap RDSB including bitmap BM2 including the four bits (1, 0, 1, 0), thereby indicating that there are dirty LBAs in the LBA ranges 128-143 and 160-175. In one or more embodiments, the source live migration storage device 250 may send the bitmap BM2 to the source live migration server 100*b*.

The source live migration server 100*b* may also query the drive at LBA 192 with the second granularity size G2 of 16 LBAs in the second iteration IT2. Accordingly, the source live migration storage device 250 may divide the region R4 into four regions R41, R42, R43, and R44. Each of the four regions may have a size of 16 LBAs. R41 may correspond to LBAs 192 to 207, R42 may correspond to LBAs 208 to 223, R43 may correspond to LBAs 224 to 239, and R44 may correspond to LBAs 240 to 255. Because region R41 includes dirty pages, and because regions R42, R43, and R44 do not include any dirty pages, the source live migration storage device 250*b* may generate a results data structure bitmap RDSB including bitmap BM3 including the four bits (1, 0, 0, 0), thereby indicating that there are dirty LBAs in the LBA range 192-207. In one or more embodiments, the source live migration storage device 250*b* may send the bitmap BM3 to the source live migration server 100*b*.

The source live migration server 100*b* may query the drive at LBA 128 with the third granularity size G3 of 4 LBAs in a third iteration IT3. Accordingly, the source live migration storage device 250*b* may divide the region R31 into four regions. The four regions may include R311, as shown in FIG. 2, and R312, R313, and R314, which are not labeled in FIG. 2. (The double asterisks () depicted next to R311 and TV in FIG. 2** are intended to link R311 to an example case, discussed below, where R311 meets a threshold granularity TG.) Each of the four regions may have a size of 4 LBAs. R311 may correspond to LBAs 128 to 131, R312 may correspond to LBAs 132 to 135, R313 may correspond to LBAs 136 to 139, and R314 may correspond to LBAs 140 to 143. Because regions R311 and R312 include dirty pages, and because regions R313 and R314 do not include any dirty pages, the source live migration storage device 250*b* may generate a results data structure bitmap RDSB including bitmap BM4 including the four bits (1, 1, 0, 0), thereby indicating that there are dirty LBAs in the LBA ranges 128-131 and 132-135. In one or more embodiments, the source live migration storage device 250*b* may send the bitmap BM4 to the source live migration server 100*b*.

In one or more embodiments, the source live migration server 100*b* may query the drive at LBAs 128 and 132 with the fourth granularity size G4 of 2 LBAs in a fourth iteration IT4. Alternatively, in one or more other embodiments, the source live migration server 100*b* may determine that the recursive large-to-small-granularity querying pattern is associated with a threshold value TV that is a threshold granularity size TG of 2 LBAs, meaning that there may be 8 contiguous LBAs remaining that could possibly include dirty pages. Accordingly, in such embodiments the source live migration storage device 250*b* may exit the recursive querying pattern, and may return an LBA list or cause the source live migration server 100*b* to copy all of the 8 remaining LBAs (e.g., the LBA range of 128-135 corresponding to regions R311 and R312), assuming that all 8 LBAs include dirty pages because the number of remaining contiguous LBAs in the relevant region is sufficiently small. For example, any resulting copying of potentially clean LBAs (e.g., LBAs that are not dirty) would not introduce significant latencies.

The source live migration server 100*b* may query the drive at LBA 160 with the third granularity size G3 of 4 LBAs in the third iteration IT3. Accordingly, the source live migration storage device 250*b* may divide the region R33 into four regions. The four regions may include R331, as shown in FIG. 2, and R332, R333, and R334, which are not labeled in FIG. 2. Each of the four regions may have a size of 4 LBAs. R331 may correspond to LBAs 160 to 163. The region R331 includes dirty pages, and the regions R332, R333, and R334 do not include any dirty pages.

In one or more embodiments, the source live migration storage device 250*b* may determine that the recursive large-to-small-granularity querying pattern is associated with a threshold value TV that is: (i) a threshold number of storage locations TN of 1 LBA; or (ii) a threshold number of storage locations per bitmap TNB of 1 LBA. Accordingly, in such embodiments, because region R331 includes only one LBA that is dirty, or because region R331 corresponds to a bitmap BM5 including only one LBA that is dirty, the source live migration storage device 250 may exit the recursive querying pattern, and may generate a results data structure list RDSL including an LBA list with LBA 162, instead of sending the bitmap BM5.

Likewise, in one or more embodiments, the source live migration server 100*b* may query the drive at LBA 192 with the third granularity size G3 of 4 LBAs in the third iteration IT3, and may determine that the recursive large-to-small-granularity querying pattern is associated with a threshold value TV that is: (i) a threshold number of storage locations TN of 1 LBA; or (ii) a threshold number of storage locations per bitmap TNB of 1 LBA. Accordingly, because region R411 includes only one LBA that is dirty or because region R411 corresponds to a bitmap BM6 including only one LBA that is dirty, the source live migration storage device 250 may exit the recursive querying pattern, and may generate a results data structure list RDSL including an LBA list with LBA 193, instead of sending the bitmap BM6.

It should be understood that the example of FIG. 2 is a simple example, in part, because results bitmaps may be kilobytes (KB) in length in practice. For example, each results bitmap size may be 4 KB instead of 4 bits.

Figure 3:
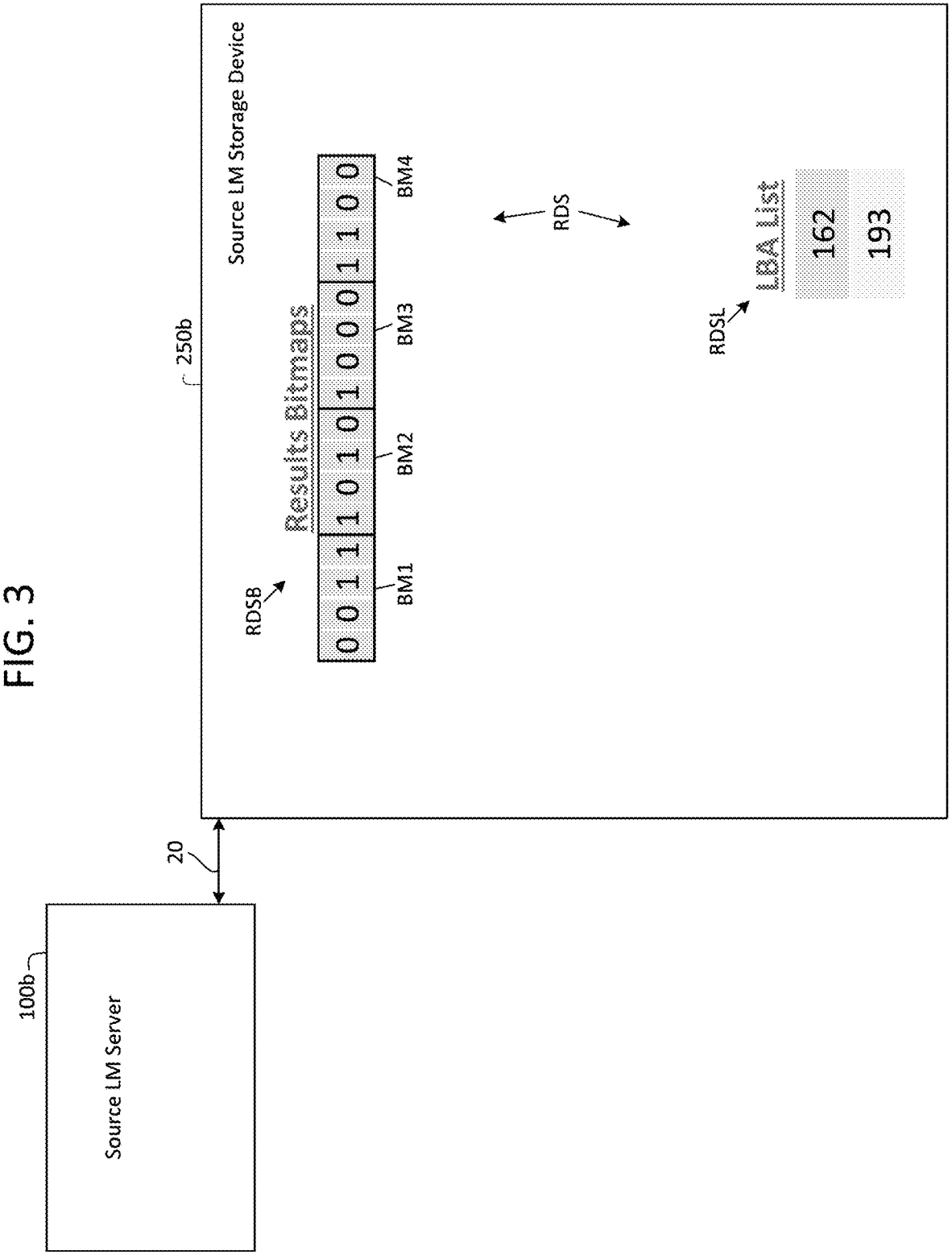
FIG. 3 is a diagram depicting the generation of an accumulated-results data structure for communicating information for performing a live migration, according to one or more embodiments of the present disclosure.

FIG. 3 is a diagram depicting the generation of an accumulated-results data structure for communicating information for performing a live migration, according to one or more embodiments of the present disclosure.

Referring to FIG. 3, in one or more embodiments, the source live migration server 100*b* (see FIG. 1) and the source live migration storage device 250*b* may be configured to reference one or more parameters of an agreed-upon recursive large-to-small-granularity querying pattern. In one or more embodiments, the parameters may be stored on the source live migration storage device 250*b* and/or stored on the source live migration server 100*b*. The parameters may include agreed-upon communication and granularity settings. For example, the source live migration storage device 250*b* may be configured to send available granularity settings to the source live migration server 100*b*. Alternatively, the source live migration storage device 250*b* may be configured to receive granularity settings from the source live migration server 100*b*. Accordingly, in one or more embodiments, a recursive large-to-small-granularity querying pattern may be performed by the source live migration storage device 250*b* based on receiving only one administrative command from the source live migration server 100*b*. For example, the source live migration storage device 250*b* may perform the simple example discussed above with respect to FIG. 2 in a manner that is more programmatic (or automated) than handling and responding to one query at a time from the source live migration server 100*b*. For example, the source live migration storage device 250*b* may perform each iteration of the recursive querying pattern automatically based on one administrative command from the source live migration server 100*b*.

In one or more embodiments, the source live migration storage device 250*b* may perform the recursive large-to-small-granularity querying pattern, and may generate or create a results data structure RDS that includes a results data structure bitmap RDSB (e.g., a results bitmap composed of one or more bitmaps), and/or that includes a results data structure list RDSL (e.g., an LBA list including one or more LBAs). The results data structure RDS may include all of the same information that would be conveyed by handling and responding to one query at a time from the source live migration server 100*b*, but in an accumulated format. For example, the accumulated-results data structure RDS may include two different pieces of information (e.g., data structures) that are configured to be sent from the source live migration storage device 250*b* to the source live migration server 100*b*: (i) an accumulated-results data structure bitmap RDSB; and (ii) an accumulated-results data structure list RDSL. For example, as discussed above with respect to FIG. 2, the source live migration storage device 250*b* may generate four results data structure bitmaps RDSB (e.g., BM1, BM2, BM3, and BM4). However, instead of sending each individual bitmap to the source live migration server 100*b* individually, the source live migration storage device 250*b* may store each results data structure bitmap RDSB at the source live migration storage device 250*b* and wait until exiting the recursive large-to-small-granularity querying pattern to send an accumulated-results data structure RDS.

Figure 4:
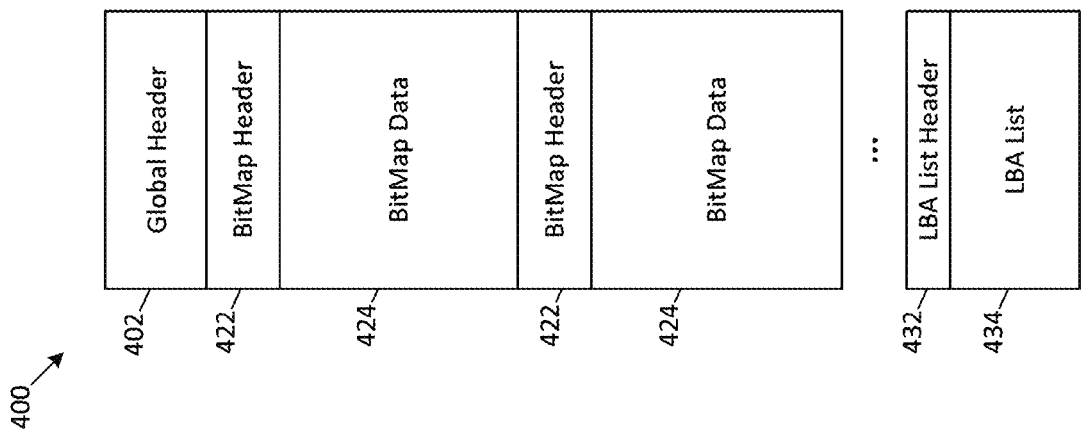
FIG. 4 is a diagram depicting a self-describing return structure for communicating information for performing a live migration, according to one or more embodiments of the present disclosure.

FIG. 4 is a diagram depicting a self-describing return structure for communicating information for performing a live migration, according to one or more embodiments of the present disclosure.

Referring to FIG. 4, the source live migration storage device 250*b* (see FIG. 1) may generate a self-describing return data structure 400 to communicate an accumulated-results data structure RDS (see FIG. 3) to the source live migration server 100b. For example, the source live migration storage device 250b may construct headers for the self-describing return data structure 400 to communicate the accumulated-results data structure RDS to the source live migration server 100b. In one or more embodiments, the self-describing return data structure 400 may include a global header 402. The self-describing return data structure 400 may also include one or more bitmap headers 422 and/or an LBA list header 432. Each bitmap header 422 may correspond to respective bitmap data 424. The LBA list header 432 may correspond to an LBA list 434. The global header 402 may indicate what information will be provided next within the self-describing return data structure 400. The bitmap headers 422 may indicate the size of their respective bitmaps.

In one or more embodiments, the global header 402 may include one or more of the following entries: Source Controller ID; Source Namespace ID; Mapped vs. Dirty Return Data; Timestamp Start (e.g., when dirty page tracking began); Timestamp Stop (e.g., when dirty page tracking ended); Number of BitMaps (e.g., indicating that two bitmap headers are included in the self-describing return data structure 400); Size of all BitMaps (if they are all the same size); Presence of LBA List (e.g., indicating whether an LBA list header is included in the self-describing return data structure 400); and More Data Pending (Part 1 of 2). The More Data Pending entry may indicate whether the self-describing return data structure 400 is a partial version due to a portion of the information exceeding the size of (e.g., not being able to fit within) a return buffer RB (see FIG. 1) on the source live migration server 100b. For example, the self-describing return data structure 400 may be copied to the return buffer RB, allocated by the source live migration server 100b for copying the results data structure RDS. The return buffer RB may correspond to the pointer P, which may have been included with a request from the source live migration server 100b. In one or more embodiments, the Timestamp Start and Timestamp Stop entries may be replaced by Sequence Number and Time Delta entries.

In one or more embodiments, the bitmap headers 422 may include one or more of the following entries: Granularity of BitMap; Starting_LBA (e.g., for a specific bitmap corresponding to a specific bitmap header 422); Ending_LBA (e.g., for the specific bitmap) and/or Size of this BitMap (e.g., to describe the specific bitmap if not all of the bitmaps are the same size); and Bitmap Data (e.g., the 0's and 1's indicating whether a given LBA includes data to be copied from the source storage 200 to the target storage 300).

In one or more embodiments, the LBA list headers 432 may include one or more of the entries Number of Entries and List of LBAs.

FIG. 5 is a flowchart depicting example operations of methods for the communicating information for performing a live migration, according to some embodiments of the present disclosure.

Referring to FIG. 5, a method 5000 may include one or more of the following operations. A source live migration storage device 250b (see FIG. 1) may receive a request from a source live migration server 100b for information indicating that one or more LBAs of a source storage 200 include data to be copied C from the source storage 200 to a target storage 300 (operation 5001). The source live migration storage device 250b may enter a recursive query pattern (e.g., a large-to-small-granularity query pattern) (operation 5002). The source live migration storage device 250b may determine that a first region of the source storage 200, which has a size that is equal to a first granularity size, includes an LBA including data to be copied C from the source storage 200 to the target storage 300 (operation 5003). In response to the determination of operation 5003, the source live migration storage device 250b may determine that a second region, within the first region, includes the LBA (the second region may have a size that is equal to a second granularity size that is (i) smaller than (or less than) the first granularity size, and that is (ii) bigger than (or greater than) a third granularity size corresponding to a third region that is within the second region and that includes the LBA) (operation 5004). The source live migration storage device 250b may exit the query pattern based on determining that the second region is associated with a threshold value TV (operation 5005). The source live migration storage device 250b may send a results data structure RDS indicating that the second region includes the storage location, and including aggregate results with headers, to the source live migration server 100b in response to the second region being associated with the threshold value TV (operation 5006).

As used herein, when a "data structure" is described as "indicating" a location of data, it may mean that an element of the data structure (e.g., a bit of a bitmap, if the data structure is or includes a bitmap) points to, or indicates, the location of the data.

Accordingly, embodiments of the present disclosure provide improvements and advantages for communicating tracking metadata (e.g., metadata for tracking valid or dirty pages) from a source live migration controller to a source live migration server using recursive large-to-small-granularity querying. By allowing for automation of the recursive querying pattern and/or an early exit from the recursive querying pattern, bandwidth may be saved due to fewer commands being sent from the source live migration server to the source live migration controller. Furthermore, latency may be reduced by reducing the time spent by the source live migration controller in creating bitmaps and by reducing the time spent by the source live migration server in parsing each bitmap. Additionally, tracking information regarding a large namespace may be represented by a relatively small amount of metadata.

Example embodiments of the disclosure may extend to the following statements, without limitation:

Statement 1. An example method includes: determining, by a storage device, that a first region of a source storage includes a storage location including data to be copied from the source storage to a target storage, the first region having a size that is equal to a first granularity size, determining, by the storage device, that a second region within the first region includes the storage location, the second region having a size that is equal to a second granularity size that is less than the first granularity size, determining that the second region is associated with a threshold value, exiting a query pattern that includes the first granularity size and the second granularity size, and sending a results data structure indicating that the second region includes the storage location.

Statement 2. An example method includes the method of statement 1 and further includes receiving, at the storage device, a request for information indicating that one or more storage locations include data to be copied from the source storage to the target storage, the request being associated with the first granularity size, wherein the results data structure includes a bitmap indicating that the first region or the second region includes one or more storage locations including data to be copied from the source storage to the target storage, or a listing of one or more logical block addresses (LBAs) including the data to be copied.

Statement 3. An example method includes the method of statement 2 and further includes determining that a number of storage locations that are within the first region or the second region and that include data to be copied from the source storage to the target storage is equal to or less than a threshold number of storage locations as the threshold value, wherein the results data structure includes the listing of the one or more LBAs.

Statement 4. An example method includes the method of statement 2 and further includes determining that a number of storage locations that correspond to a second bitmap and that include data to be copied from the source storage to the target storage is equal to or less than a threshold number of storage locations per bitmap as the threshold value, wherein the first region is associated with a first bitmap, wherein the second region is associated with the second bitmap, wherein the second bitmap indicates that one or more storage locations within the second region include data to be copied from the source storage to the target storage, and wherein the results data structure includes the listing of the one or more LBAs.

Statement 5. An example method includes the method of statement 2 and further includes determining that the second granularity size is equal to or less than a threshold granularity size as the threshold value, wherein the results data structure includes the listing of the one or more LBAs.

Statement 6. An example method includes the method of statement 2 and further includes copying data corresponding to all storage locations within the second region, wherein the threshold value may include a threshold granularity size or a number of remaining contiguous LBAs.

Statement 7. An example method includes the method of statement 2 and further includes determining the first granularity size or the second granularity size based on information that is stored on the storage device, wherein the request for information is directed to a namespace including the one or more storage locations, and wherein the first region and the second region correspond to the namespace.

Statement 8. An example method includes the method of any of statements 1-7, wherein the query pattern includes a recursive query pattern, the second granularity size is greater than a third granularity size corresponding to a third region that is within the second region, and that includes the storage location, the first region is associated with a first data structure indicating that one or more storage locations within the first region include data to be copied from the source storage to the target storage, the second region is associated with a second data structure indicating that one or more storage locations within the second region include data to be copied from the source storage to the target storage, and the results data structure includes a self-describing return data structure including the first data structure, the second data structure, a global header, and a bitmap header or an LBA list header.

Statement 9. An example method includes: receiving, at a storage device, an initial request for information indicating that one or more storage locations include data to be copied from a source storage to a target storage, the initial request being associated with a first granularity size, determining, by the storage device, that a first region of the source storage includes a storage location including data to be copied from the source storage to the target storage, the first region having a size that is equal to the first granularity size, and determining automatically, based on the initial request, that a second region within the first region includes the storage location, the second region having a size that is equal to a second granularity size that is less than the first granularity size.

Statement 10. An example method includes the method of statement 9 and further includes determining that the second region is associated with a threshold value, and sending, by the storage device, a results data structure.

Statement 11. An example method includes the method of statement 10 and further includes determining that the second region is associated with the threshold value, and exiting a recursive query pattern that includes the first granularity size and the second granularity size.

Statement 12. An example method includes the method of any of statements 10 and 11, wherein the first region is associated with a first data structure indicating that one or more storage locations within the first region include data to be copied from the source storage to the target storage, the second region is associated with a second data structure indicating that one or more storage locations within the second region include data to be copied from the source storage to the target storage, and the results data structure includes a self-describing return data structure including the first data structure, the second data structure, a global header, and a bitmap header or an LBA list header.

Statement 13. An example device for performing the method of any of statements 1-12 includes a controller and a memory.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for communicating information, the method comprising:
  determining, by a storage device, that a first region of a source storage comprises a storage location comprising data to be copied from the source storage to a target storage, the first region having a size that is equal to a first granularity size;
  determining, by the storage device, that a second region within the first region comprises the storage location, the second region having a size that is equal to a second granularity size that is less than the first granularity size;
  determining that the second region is associated with a threshold value;
  exiting a query pattern that includes the first granularity size and the second granularity size; and
  sending a results data structure indicating that the second region comprises the storage location.

2. The method of claim 1, further comprising receiving, at the storage device, a request for information indicating that one or more storage locations comprise data to be copied from the source storage to the target storage, the request being associated with the first granularity size,
  wherein the results data structure comprises:
    a bitmap indicating that the first region or the second region comprises one or more storage locations comprising data to be copied from the source storage to the target storage; or
    a listing of one or more logical block addresses (LBAs) comprising the data to be copied.

3. The method of claim 2, further comprising determining that a number of storage locations that are within the first region or the second region and that comprise data to be copied from the source storage to the target storage is equal to or less than a threshold number of storage locations as the threshold value,
  wherein the results data structure comprises the listing of the one or more LBAs.

4. The method of claim 2, further comprising determining that a number of storage locations that correspond to a second bitmap and that comprise data to be copied from the source storage to the target storage is equal to or less than a threshold number of storage locations per bitmap as the threshold value,
  wherein the first region is associated with a first bitmap,
  wherein the second region is associated with the second bitmap,
  wherein the second bitmap indicates that one or more storage locations within the second region comprise data to be copied from the source storage to the target storage, and
  wherein the results data structure comprises the listing of the one or more LBAs.

5. The method of claim 2, further comprising determining that the second granularity size is equal to or less than a threshold granularity size as the threshold value,
  wherein the results data structure comprises the listing of the one or more LBAs.

6. The method of claim 2, further comprising copying data corresponding to all storage locations within the second region,
  wherein the threshold value comprises a threshold granularity size or a number of remaining contiguous LBAs.

7. The method of claim 2, further comprising determining the first granularity size or the second granularity size based on information that is stored on the storage device,
  wherein the request for information is directed to a namespace comprising the one or more storage locations, and
  wherein the first region and the second region correspond to the namespace.

8. The method of claim 2, wherein:
  the query pattern comprises a recursive query pattern;
  the second granularity size is greater than a third granularity size corresponding to a third region that is within the second region, and that comprises the storage location;
  the first region is associated with a first data structure indicating that one or more storage locations within the first region comprise data to be copied from the source storage to the target storage;
  the second region is associated with a second data structure indicating that one or more storage locations within the second region comprise data to be copied from the source storage to the target storage; and
  the results data structure comprises a self-describing return data structure comprising:
    the first data structure;
    the second data structure;
    a global header; and
    a bitmap header or an LBA list header.

9. A storage device for communicating information, the storage device being configured to:
  determine that a first region of a source storage comprises a storage location comprising data to be copied from the source storage to a target storage, the first region having a size that is equal to a first granularity size;
  determine that a second region within the first region comprises the storage location, the second region having a size that is equal to a second granularity size that is less than the first granularity size;
  determine that the second region is associated with a threshold value;
  exit a query pattern that includes the first granularity size and the second granularity size; and
  send a results data structure indicating that the second region comprises the storage location.

10. The storage device of claim 9, configured to receive a request for information indicating that one or more storage locations comprise data to be copied from the source storage to the target storage, the request being associated with the first granularity size,
  wherein the results data structure comprises:
    a bitmap indicating that the first region or the second region comprises one or more storage locations comprising data to be copied from the source storage to the target storage; or
    a listing of one or more logical block addresses (LBAs) comprising the data to be copied.

11. The storage device of claim 10, configured to determine that a number of storage locations that are within the first region or the second region and that comprise data to be copied from the source storage to the target storage is equal to or less than a threshold number of storage locations as the threshold value,
  wherein the results data structure comprises the listing of the one or more LBAs.

12. The storage device of claim 10, configured to determine that a number of storage locations that correspond to a second bitmap and that comprise data to be copied from the source storage to the target storage is equal to or less than a threshold number of storage locations per bitmap as the threshold value,
  wherein the first region is associated with a first bitmap,
  wherein the second region is associated with the second bitmap,
  wherein the second bitmap indicates that one or more storage locations within the second region comprise data to be copied from the source storage to the target storage, and
  wherein the results data structure comprises the listing of the one or more LBAs.

13. The storage device of claim 10, configured to determine that the second granularity size is equal to or less than a threshold granularity size as the threshold value,
  wherein the results data structure comprises the listing of the one or more LBAs.

14. The storage device of claim 10, further comprising copying data corresponding to all storage locations within the second region,
  wherein the threshold value is a threshold granularity size or a number of remaining contiguous LBAs.

15. The storage device of claim 10, configured to determine the first granularity size or the second granularity size based on information that is stored on the storage device,
  wherein the request for information is directed to a namespace comprising the one or more storage locations, and
  wherein the first region and the second region correspond to the namespace.

16. The storage device of claim 10, wherein:
  the query pattern comprises a recursive query pattern;
  the second granularity size is greater than a third granularity size corresponding to a third region that is within the second region, and that comprises the storage location;

the first region is associated with a first data structure indicating that one or more storage locations within the first region comprise data to be copied from the source storage to the target storage;

the second region is associated with a second data structure indicating that one or more storage locations within the second region comprise data to be copied from the source storage to the target storage; and the results data structure comprises a self-describing return data structure comprising:
the first data structure;
the second data structure;
a global header; and
a bitmap header or an LBA list header.

17. A method for communicating information, the method comprising:

receiving, at a storage device, an initial request for information indicating that one or more storage locations comprise data to be copied from a source storage to a target storage, the initial request being associated with a first granularity size;

determining, by the storage device, that a first region of the source storage comprises a storage location comprising data to be copied from the source storage to the target storage, the first region having a size that is equal to the first granularity size; and determining automatically, based on the initial request, that a second region within the first region comprises the storage location, the second region having a size that is equal to a second granularity size that is less than the first granularity size.

18. The method of claim 17, further comprising:
determining that the second region is associated with a threshold value; and
sending, by the storage device, a results data structure.

19. The method of claim 18, further comprising:
determining that the second region is associated with the threshold value; and
exiting a recursive query pattern that includes the first granularity size and the second granularity size.

20. The method of claim 19, wherein:
the first region is associated with a first data structure indicating that one or more storage locations within the first region comprise data to be copied from the source storage to the target storage;

the second region is associated with a second data structure indicating that one or more storage locations within the second region comprise data to be copied from the source storage to the target storage; and the results data structure comprises a self-describing return data structure comprising:
the first data structure;
the second data structure;
a global header; and
a bitmap header or an LBA list header.

* * * * *